H. F. SCHERR.
Filter.
No. 165,512.  
Patented July 13, 1875.
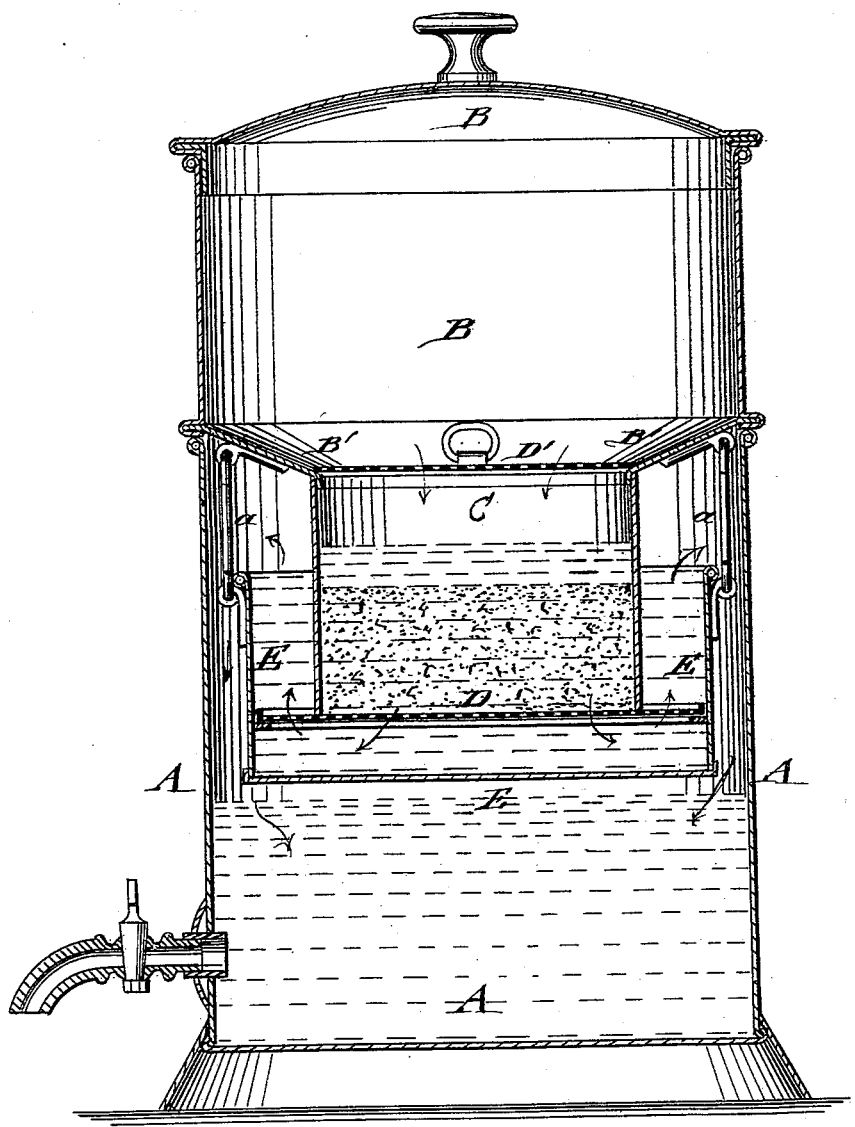
WITNESSES:  
E. Wolff  
A. F. Terry
INVENTOR:  
H. F. Scherr  
BY  
ATTORNEYS.

UNITED STATES PATENT OFFICE.

HENRY F. SCHERR, OF ST. LOUIS, MISSOURI.

IMPROVEMENT IN FILTERS.

Specification forming part of Letters Patent No. 165,512, dated July 13, 1875; application filed June 12, 1875.

*To all whom it may concern:*

Be it known that I, HENRY F. SCHERR, of St. Louis, in the county of St. Louis and State of Missouri, have invented a new and Improved Filter, of which the following is a specification:

The accompanying drawing represents a vertical transverse section of my improved filter.

My invention relates to an improved filter that will successfully remove all impurities of the water, and may be readily cleaned, provided with new filtering material, and have the parts quickly replaced for use.

The invention consists of a filter, composed of a lower reservoir for the filtered water, an upper receptacle with filtering-tube for receiving the water to be filtered, and of an intermediate filtering-pan attached to filtering-tube to compel the water to pass first in downward, and then in upward, direction through the filtering material.

In the drawing, A represents the reservoir for the reception of the filtered water, which forms the base part of my filter, and is provided with a faucet to draw off the water for use. B is the upper part or receptacle, which is detachable from the main reservoir, being provided with a conically-tapering base, B', having a central downward-extending filtering-tube, C. The filtering-tube C has a fixed perforated bottom, D, and a loose perforated top, D', between which the filtering material is retained. The fixed bottom D is extended to suitable width beyond the tube C, which extension is also perforated and fitted into a filtering-pan, E, that surrounds tube C, and is hung by connecting-hooks *a* to the conical bottom part of receptacle B. The fixed perforated bottom D is covered at the interior and exterior part with a covering of thin cotton or other cloth for retaining the filtering material, and the interior of the tube C, and the space between tube C and pan E, filled up with the filtering material. The bottom D rests on a projecting rim or lugs of pan E, a space for the passage of the water being formed between the perforated bottom D and the bottom of pan E. The water passes first through the filtering-tube C, which removes all impurities that do not sink with the water, and is then forced upward through the outer layer, removing all impurities that do not rise with the water. The filtered water passes finally over the rim of pan E into the main receptacle below, retaining in the space below the perforated bottom the sediments, that are not allowed to pass up through the outer layer. The filter is of simple and cheap construction, and readily taken apart for cleaning and refilling, doing very satisfactory work with a small quantity of material.

Having thus described my invention, I claim as new and desire to secure by Letters Patent—

A filter composed of base reservoir A, top receptacle B, with central filtering-tube, having perforated top and bottom, and of a surrounding filtering-pan fitted and secured around bottom of central tube, all arranged and operating substantially as and for the purpose set forth.

HENRY F. SCHERR.

Witnesses:
I. D. FOWLER,
G. M. STEWART.